United States Patent

Nishioka et al.

(10) Patent No.: US 8,960,036 B2
(45) Date of Patent: Feb. 24, 2015

(54) GEAR COUPLING DEVICE AND GEAR COUPLING METHOD

(75) Inventors: Akira Nishioka, Hitachinaka (JP); Hiroyasu Kuniyoshi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 513 days.

(21) Appl. No.: 13/368,355

(22) Filed: Feb. 8, 2012

(65) Prior Publication Data

US 2012/0210811 A1  Aug. 23, 2012

(30) Foreign Application Priority Data

Feb. 17, 2011  (JP) ................................. 2011-032392

(51) Int. Cl.
| | |
|---|---|
| *F16H 59/68* | (2006.01) |
| *F02N 11/08* | (2006.01) |
| *F02N 15/06* | (2006.01) |
| *F16H 61/04* | (2006.01) |
| *F16H 3/30* | (2006.01) |
| *F16H 59/38* | (2006.01) |
| *F16H 61/28* | (2006.01) |

(52) U.S. Cl.
CPC ............ *F02N 11/0851* (2013.01); *F02N 15/06* (2013.01); *F16H 61/0403* (2013.01); *F16H 3/30* (2013.01); *F16H 59/38* (2013.01); *F16H 61/2807* (2013.01); *F16H 2061/047* (2013.01)
USPC .............................................. 74/405; 74/7 A (58) Field of Classification Search
CPC .. F16H 61/08; F02N 11/0851; F02N 11/0855
USPC ..................... 74/339, 352, 405, 7 A
See application file for complete search history.

(56) References Cited

U.S. PATENT DOCUMENTS

| | | | | |
|---|---|---|---|---|
| 3,798,977 | A | * | 3/1974 | Digby ................................ 74/6 |
| 5,653,143 | A | * | 8/1997 | Langevin ......................... 74/348 |
| 6,450,053 | B1 | * | 9/2002 | Friedrichs et al. .............. 74/352 |

(Continued)

FOREIGN PATENT DOCUMENTS

| | | |
|---|---|---|
| JP | 60-101261 U | 7/1985 |
| JP | 2001-248710 | 9/2001 |

(Continued)

OTHER PUBLICATIONS

Office Action of JP Appln. No. 2011-032392 dated May 7, 2013 with English translation.

(Continued)

*Primary Examiner* — David M Fenstermacher
*Assistant Examiner* — Terence Boes
(74) *Attorney, Agent, or Firm* — Antonelli, Terry, Stout & Kraus, LLP.

(57) ABSTRACT

A gear coupling device and a gear coupling method reduce a vibration and noise caused at the time of engagement of gears. The gear coupling device transmits power through the engagement of the gears and uncouples the gears from each other by causing at least one of the gears to move in an axial direction of the gear. A determining section determines, on the basis of signals detected by rotation sensors, whether or not an end surface of a tooth of the axially moving gear lies between an end surface of a first tooth of the other gear and an end surface of a second tooth of the other gear. A driving section causes the gear to move in the axial direction on the basis of the determination result of the determining section and causes the gears to be coupled to each other.

6 Claims, 5 Drawing Sheets

(56) References Cited

U.S. PATENT DOCUMENTS 8,534,145 B2 * 9/2013 Niimi et al. .................... 74/7 R
2010/0282199 A1 * 11/2010 Heyers et al. .............. 123/179.3

FOREIGN PATENT DOCUMENTS

| JP | 2005-147312 A | 6/2005 |
|---|---|---|
| JP | 2006-083919 | 3/2006 |
| JP | 2006-83919 | 3/2006 |
| JP | 2011-214535 | 10/2011 |
| WO | WO 2010/122664 | 10/2010 |

OTHER PUBLICATIONS

U.S. Appl. No. 13/196,099.

EP Search Report of Appln. No. 12154092.6 dated May 14, 2012.

* cited by examiner

FIG.1

FIG.2A
S1 Signal

FIG.2B
S2 Signal

FIG.7A
S1 Signal

FIG.7B
S2 signal

FIG.8

GEAR COUPLING DEVICE AND GEAR COUPLING METHOD

BACKGROUND OF THE INVENTION

1. Field of the Invention

The present invention relates to a gear coupling device and a gear coupling method which carry out operations for power transmission and power transmission switching by gears.

2. Description of the Related Art

Traditionally, a known gear device for an engine starting device includes gears having chamfered portions at its end surfaces for the engagement of the gears with each other for coupling the gears (refer to, for example, JP-2001-248710-A). The engine starting device couples the gears to each other only for starting the engine and thereby transmits power. When a start-up operation ends, the engine starting device uncouples the gears from each other. Since the gears remain coupled to each other only during the engine start-up operation, an unnecessary mechanical friction normally does not occur. Therefore system efficiency can be improved. Thus-configured system needs to conduct an operation for engaging the gears with each other, and therefore chamfering at the end surfaces of the gears is effective as described in JP-2001-248710-A.

In conjunction with coupling of rotary bodies, a control device provided with a phase control unit is known (refer to, for example, JP-2006-83919-A). The phase control unit controls a rotational state of a first engaging member based on a phase difference between a tooth of the first engaging member and a tooth of a second engaging member. The technique described in the JP-2006-83919-A is effective to switch gears of a geared transmission for a vehicle. In general, the vehicular geared transmission has a clutch mechanism and a decelerating mechanism using the gears. The clutch mechanism is a device for switching an operation for whether the gears are to transmit power or not. The clutch mechanism and the reduction mechanism are combined to thereby change a path for transmitting power and switch the gears, with the clutch mechanism achieving a smooth switching operation. When this system is used, however, the gears per se remain engaged with each other even if power is not being transmitted, which will generate an unnecessary mechanical friction.

SUMMARY OF THE INVENTION

In the system that switches whether to transmit power by coupling and uncoupling the gears, the gears serve as two functions that are a decelerating device and a switching device. Thereby the number of parts can be reduced, this leads to the downsizing of the system. In addition, an unnecessary mechanical friction does not occur, and the energy efficiency of the system can be improved.

However, in order to couple the gears to each other from the state in which the gears are uncoupled, a technique for engaging the gears to each other is necessary. In the conventional technique, the gears had to be engaged after the end surfaces of the gears have contacted each other. If the end surfaces of the gears contact each other before the gears are engaged, then vibration and noise will occur at the time of contact, and the end surfaces of the gears will be worn-out.

In order to engage teeth (nails) of rotary bodies (other than gears) to each other without a contact of end surfaces, a phase adjusting unit that matches phases of the teeth of the rotary bodies needs to be provided.

An object of the present invention is to provide a gear coupling device and a gear coupling method, which reduce a vibration and noise caused at the time of engagement of gears.

(1) In order to accomplish the aforementioned object, according to the present invention, a gear coupling device includes: two gears that are engaged with each other for power transmission, with the two engaging gears being uncoupled from each other when at least one of the gears axially moves; rotation sensors that detect the rotation of each of the gears; and a determining section that determines, on the basis of signals detected by the rotation sensors, whether or not an end surface of a tooth of the axially moving gear lies between an end surface of a first tooth of the other gear and an end surface of a second tooth of the other gear, the first tooth being adjacent to the second tooth; wherein the gears are coupled to each other from disengaging state in response to a result of determination made by the determining section.

According to the configuration, a vibration and noise caused at the time of engagement of gears can be reduced.

(2) In Item (1), it is preferable that the determining section perform a calculation using the difference between a time when one of the rotation sensors detects that a tooth of one of the gears passes the one of the rotation sensors and a time when the other rotation sensor detects that a tooth of the other gear passes the other rotation sensor, a time interval between a time when the one of the rotation sensors detects that a tooth of the one of the gears passes the one of the rotation sensors and a time when the one of the rotation sensors detects that another tooth of the one of the gears passes the one of the rotation sensors, a time interval between a time when the other rotation sensor detects that a tooth of the other gear passes the other rotation sensor and a time when the other rotation sensor detects that another tooth of the other gear passes the other rotation sensor, and a time period from a time when the determining section determines that it is time for the gear to start moving in the axial direction to a time when the position of an end surface of a tooth of one of the gears matches the position of an end surface of a tooth of the other gear, and the determining section determine, on the basis of a result of the calculation, whether or not it is time for the gear to start moving in the axial direction.

(3) In Item (2), it is preferable that the determining section determine that it is time for the gear to start moving in the axial direction, $t_3$ is defined when the difference between the time when the one of the rotation sensors detects that the tooth of the one of the gears passes the one of the rotation sensors and the time when the other rotation sensor detects that the tooth of the other gear passes the other rotation sensor, $t_2$ is defined with the time interval between the time when the one of the rotation sensors detects that the tooth of the one of the gears passes the one of the rotation sensors and the time when the one of the rotation sensors detects that the other tooth of the one of the gears passes the one of the rotation sensors, $t_1$ is defined with the time interval between the time when the other rotation sensor detects that the tooth of the other gear passes the other rotation sensor and the time when the other rotation gear detects that the other tooth of the other gear passes the other rotation sensor, T is defined with the time period from the time when the determining section determines that it is time for the gear to start moving in the axial direction to the time when the position of the end surface of the tooth of the one of the gears matches the position of the end surface of the tooth of the other gear, when $t_1 < t_2$, and a remainder of a division of a value of $((t_3/t_2)+(T/t_1)-(T/t_2))$ by a value of one (1) is in a predetermined range.

(4) In Item (1), it is preferable that the gears be coupled to each other, while a circumferential speed of one of the gears is higher than a circumferential speed of the other gear, the gear that rotates at the higher circumferential speed have chamfers that are edge surfaces of teeth of the gear and located on the opposite side to the side to which the gear rotates, and the gear that rotates at the lower circumferential speed have chamfers that are edge surfaces of teeth of the gear and located on the side to which the gear rotates.

(5) In order to accomplish the aforementioned object, gear coupling method includes the steps of: engaging two gears with each other for power transmission, with the two engaging gears being uncoupled from each other when at least one of the gears axially moves; and, coupling the gears to each other from the state in which the gears are uncoupled from each other when it is determined, on the basis of signals obtained by detecting the rotations of the gears, that an end surface of a tooth of the axially moving gear lies between an end surface of a first tooth of the other gear and an end surface of a second tooth of the other gear, the first and second teeth being adjacent to each other.

According to the method, a vibration and noise caused at the time of engagement of the gears can be reduced.

According to the present invention, a vibration and noise caused at the time of engagement of the gears can be reduced.

DESCRIPTION OF THE PREFERRED EMBODIMENTS

The configuration and operations of a gear coupling device according to a first embodiment of the present invention are described with reference to FIGS. 1 to 5.

First, the entire configuration of the gear coupling device according to the present embodiment is described with reference to FIG. 1.

Figure 1:
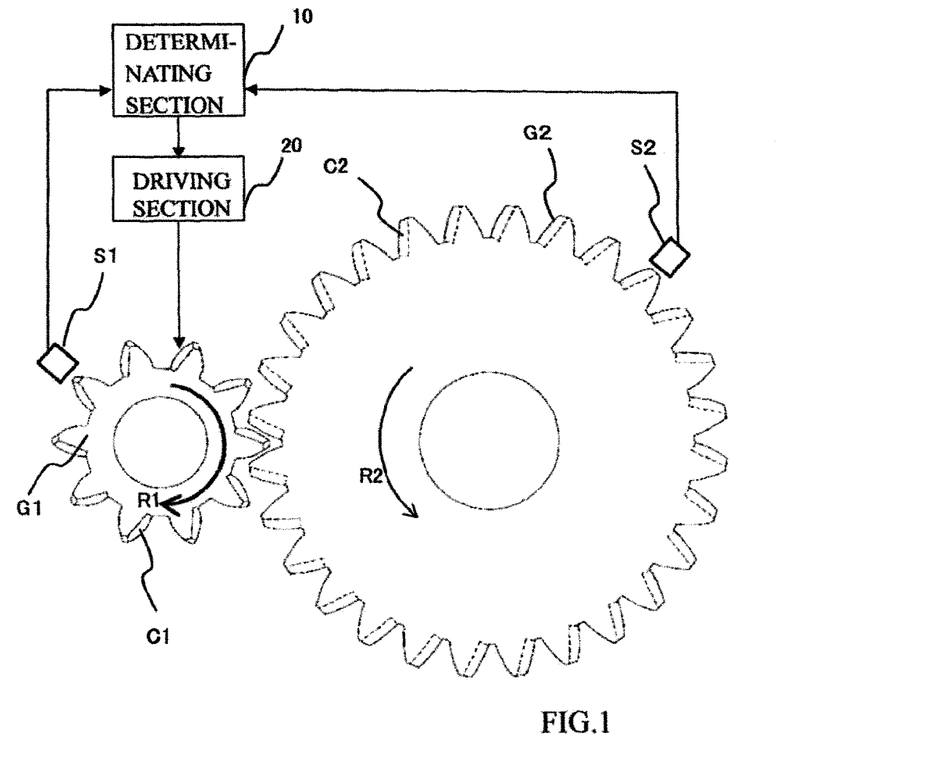
FIG. 1 is a diagram illustrating the entire configuration of a gear coupling device according to a first embodiment of the present invention.

FIG. 1 is a diagram illustrating the entire configuration of the gear coupling device according to the first embodiment of the present invention.

The first embodiment describes, as an example, a system that couples a gear G1 to a gear G2 while a circumferential speed of the gear G1 is higher than a circumferential speed of the gear G2.

The gear G1 rotates in a direction indicated by an arrow R1, while the gear G2 rotates in a direction indicated by an arrow R2 illustrated in FIG. 1. The circumferential speed of the gear G1 is higher than the circumferential speed of the gear G2. The circumferential speeds are speeds on pitch circles of the gears. The circumferential speeds are values obtained by multiplying circumferences of the pitch circle by the numbers of revolutions of the gears per unit time. In general, circumferential speeds of gears that engage with each other are equal to each other, while the numbers of revolutions of the gears per unit time are inversely proportional to each other. FIG. 1 illustrates the gear coupling device before the gears are engaged with each other, and the circumferential speeds of the gears G1 and G2 are different from each other.

A rotation sensor S1 detects a rotation of the gear G1. The rotation sensor S1 outputs a signal that varies depending on whether or not a tooth of the gear G1 comes closer to the rotation sensor S1. A rotation sensor S2 detects a rotation of the gear G2 and outputs a signal that varies depending on whether or not a tooth of the gear G2 comes closer to the rotation sensor S2. When the configuration according to the present embodiment is used, the sensors may not directly sense the gear teeth in order to detect the rotations of the gears and may indirectly sense a location at which the gears are interlocked with each other and rotate.

In order to couple the gears with each other, the gear G1 moves toward the front side of the sheet of FIG. 1 in an axial direction of the gear G1. Specifically, before the gear G1 is coupled with the gear G2, the gear G1 is located on the back side of the sheet of FIG. 1. Teeth of the gear G1 each have a chamfer C1. Teeth of the gear G2 each have a chamfer C2. When the gear G1 moves toward the front side of the sheet of FIG. 1 in the axial direction of the gear G1, the chamfers C1 of the gear G1 are located on the front side of the sheet of FIG. 1 and the opposite side to the side to which the gear G1 rotates. The chamfers C2 of the gear G2 are located on the back side of the sheet of FIG. 1 and the side to which the gear G2 rotates.

Next, the signals output from the rotation sensors that are included in the gear coupling device according to the present embodiment are described with reference to FIGS. 2A and 2B.

Figure 2A:
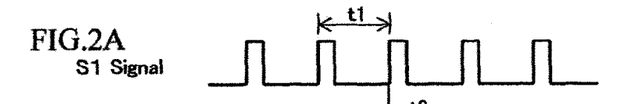
FIGS. 2A and 2B are diagrams illustrating waveforms of signals output from rotation sensors that are included in the gear coupling device according to the first embodiment of the present invention.
Figure 2B:
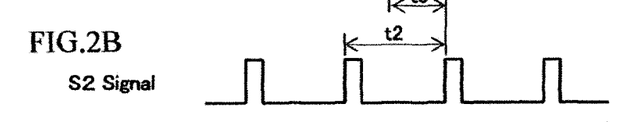

FIGS. 2A and 2B are diagrams illustrating waveforms of the signals output from the rotation sensors that are included in the gear coupling device according to the present embodiment.

The respective rotation sensors S1 and S2 output a pulse signal when the teeth of the gear G1 and G2 pass the rotation sensors S1 and S2, respectively. As illustrated in FIGS. 2A and 2B, the chronological pulse signals are obtained from the rotation sensors S1 and S2. In the signal output from the respective rotation sensor S1 and S2, pulses each indicate that a single tooth of each gear G1 and G2 pass the rotation sensors S1 and S2, respectively. Thus, time intervals between the pulses are inversely proportional to the circumferential speed of the gears. In order to calculate the time intervals between the pulses, rising times of the pulses are used. The time intervals between the pulses obtained from the rotation sensor S1 are indicated by $t_1$. The time intervals between the pulses obtained from the rotation sensor S2 due to the rotation of the gear G2 are indicated by $t_2$. When the rotational speeds of the gear G1 and G2 are not constant, the time intervals between the pulses are not constant. In order to perform a control operation according to the present embodiment, it is necessary that information of the time intervals between the pulses be updated for each of formations of the pulses. The difference between a rising time of a pulse of the signal output from the rotation sensor S1 and a rising time of a pulse of the signal output from the rotation sensor S2 is indicated by $t_3$. While information of the difference between the rising times of the pulses of the signals output from the rotation sensors is sequentially updated, the control operation is performed.

The signals that are output from the rotation sensors S1 and S2 are received by a determining section 10 illustrated in FIG. 1. The determining section 10 determines whether or not it is time for the gear G1 to start moving toward the front side of the sheet of FIG. 1 in the axial direction of the gear G1, as described later. When the determining section 10 determines that it is time for the gear G1 to start moving, the determining section 10 outputs a movement start signal to a driving section 20. The driving section 20 moves the gear G1 toward the front side of the sheet of FIG. 1 in the axial direction of the gear G1 on the basis of the movement start signal output from the determining section 10. The driving section 20 has a solenoid, for example. The gear G1 is moved toward the front side of the sheet of FIG. 1 in the axial direction of the gear G1 by applying a current to the solenoid. In addition, the driving section 20 includes a driving force source such as a motor. The gear G1 is driven by the driving force source so as to rotate in the direction indicated by the arrow R1. When the gear G1 is engaged with the gear G2, a driving force is applied by the driving force source to the gear G2 through the gear G1.

Next, a determination operation of the determining section 10 illustrated in FIG. 1 is described.

The determining section 10 uses the following determination formula (1) to determine whether or not it is time for the gear G1 to start moving.

[Formula 1]

$$\alpha \le \mathrm{MOD}\left(\frac{t_3}{t_2} + \frac{T}{t_1} - \frac{T}{t_2}, 1\right) \le \beta. \tag{1}$$

In the determination formula (1), $t_1$ is the time interval between the pulses obtained from the rotation sensor S1 as illustrated in FIG. 2A; $t_2$ is the time interval between the pulses obtained from the rotation sensor S2 as illustrated in FIG. 2B; and $t_3$ is the difference between the rising time of the pulse obtained from the rotation sensor S1 and the rising time of the pulse obtained from the rotation sensor S2.

In the present embodiment, it is assumed that the circumferential speed of the gear G1 is higher than the circumferential speed of the gear G2. Accordingly, the time interval $t_1$ between the pulses is smaller than the time interval $t_2$ between the pulses. Therefore, although the determination formula (1) includes a subtraction, the result of the subtraction is not a negative value due to the aforementioned prerequisite.

In the determination formula (1), a symbol T is a time period from the time when the determining section 10 determines that it is time for the gear G1 to start moving to a time when the position of an end surface of the gear G1 matches the position of end surfaces of the gear G2.

In the determination formula (1), a symbol MOD is a function for calculating a remainder of a division. A function MOD(x, y) means to calculate a remainder of a division of x by y. In the determination formula (1), since y=1, the remainder is in a range of 0 to 1.

In the determination formula (1), $\alpha$ and $\beta$ are predetermined thresholds and both in a range of 0 to 1.

When the values $t_1$, $t_2$ and $t_3$ satisfy the determination formula (1), the determining section 10 outputs the movement start signal. When the values $t_1$, $t_2$ and $t_3$ do not satisfy the determination formula (1), the determining section 10 does not cause the gear G1 to move and waits until the values $t_1$, $t_2$ and $t_3$ satisfy the determination formula (1).

The meaning of the determination formula (1) is described below.

In determination formula (1), the difference $t_3$ between the pulses is divided by the time interval $t_2$ between the pulses obtained from the rotation sensor 2 in order to calculate a phase difference between the tooth of the gear G1 and the tooth of the gear G2 for a descriptive purpose, while intervals between the teeth of the gear G2 are used as a reference. In addition, the time period T is divided by the time interval $t_1$ in order to predictively calculate an amount that a phase of the gear G1 progresses over the time period T. In addition, the time period T is divided by the time interval $t_2$ in order to predictively calculate an amount that a phase of the gear G2 progresses over the time period T. Thus, to calculate the difference between the amounts that the phases of the gears G1 and G2 progress means to predictively calculate the amount of change in the phase difference between the gear G1 and the gear G2 over the time period T.

The variable T is treated as a constant and the value thereof is determined on the basis of the time period for the movement of the gear G1, a time period for causing an actuator to start operating to move the gear G1, and a delay time of a control system.

The thresholds $\alpha$ and $\beta$ are values that vary depending on the installation positions of the rotation sensors S1 and S2. In addition, the thresholds $\alpha$ and $\beta$ are determined in consideration of a variation in the time period for the movement of the gear G1 and measuring errors of the rotation sensors S1 and S2.

Accordingly, a future phase difference between the tooth of the gear G1 and the tooth of the gear G2 is estimated using the function MOD of the determination formula (1) by adding the current phase difference to a change in the phase difference over time. When the future phase difference is equal to or smaller than a threshold, a tooth of the gear G1 will lie between teeth of the gear G2. This feature is described later with reference to FIG. 5.

In order to cope with a variation in an operating time, it is effective to satisfy the determination formula (1) and set the difference between the circumferential speeds of the gears to a certain range as a requirement for determining that it is time for the gear G1 to start moving.

Next, the chamfers C1 and C2 of the gears G1 and G2 that are included in the gear coupling device according to the present embodiment are described with reference to FIGS. 3 and 4.

Figure 3:
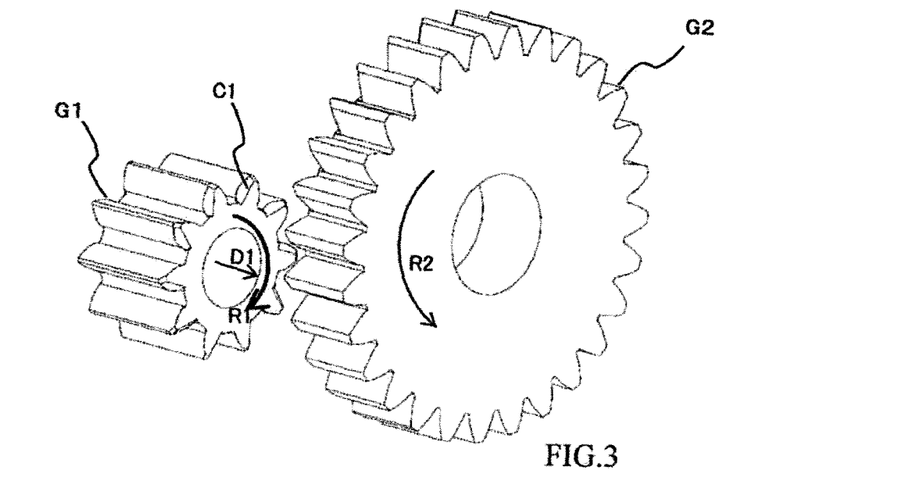
FIG. 3 is a diagram illustrating chamfers of a gear that is included in the gear coupling device according to the first embodiment of the present invention.
Figure 4:
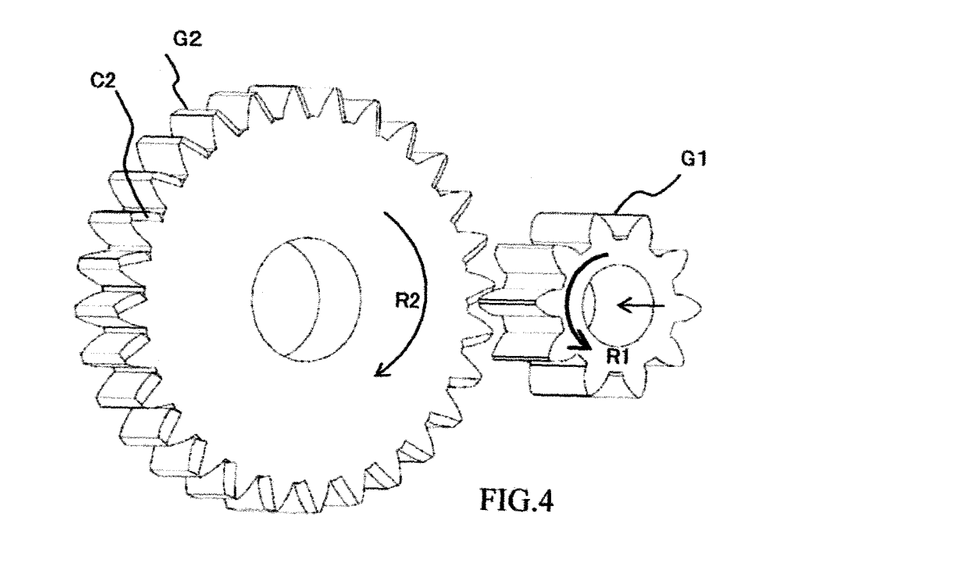
FIG. 4 is a diagram illustrating chamfers of another gear that is included in the gear coupling device according to the first embodiment of the present invention.

FIG. 3 is a diagram illustrating the chamfers C1 of the gear G1 that is included in the gear coupling device according to the first embodiment of the present invention. FIG. 4 is a diagram illustrating the chamfers C2 of the gear G2 that is included in the gear coupling device according to the first embodiment of the present invention. In FIGS. 3 and 4, reference numerals that are the same as in FIG. 1 indicate the same parts as in FIG. 1.

First, the positions of the chamfers C1 of the gear G1 are described with reference to FIG. 3. The gear G1 moves in the axial direction (indicated by an arrow D1 illustrated at the position of the axis of the gear G1 in FIG. 3) so that the gears are coupled to each other. The gear G1 rotates in a direction indicated by an arc arrow R1, while the gear G2 rotates in a direction indicated by an arc arrow R2. The chamfers C1 of the gear G1 are edge surfaces of the gear G1 and located on the side which the gear G1 moves to. In addition, the chamfers C1 of the gear G1 are located on the opposite side to the side to which the gear G1 rotates.

Next, the positions of the chamfers C2 of the gear G2 are described with reference to FIG. 4. The chamfers C2 of the gear G2 are edge surfaces of the gear G2 and located on the side which the gear G1 comes from. In addition, the chamfers C2 of the gear G2 are located on the side to which the gear G2 rotates in the direction indicated by the arc arrow R2. If the gears G1 and G2 do not have the chamfers, a space that enables a tooth of one of the gears G1 and G2 to lie between teeth of the other gear is only a backlash (allowance for the engagement of the gears). The widened backlash facilitates the engagement, however, each of the teeth of one of the gears engage with each pair of the teeth of the other gear loosens and clunks, generating louder noises. Thus, the backlash needs to be set to a value correspondingly smaller against the sizes of the teeth.

Thus, if the gears do not have the chamfers, a range is overly narrow in which the gears to be engaged with each other without a collision of the end surfaces of the teeth of the gears. By providing chamfers, the range is widened that enables the gears to be engaged with each other.

Next, operations of the gear coupling device according to the present embodiment during a process of coupling the gears to each other are described with reference to FIG. 5.

Figure 5:
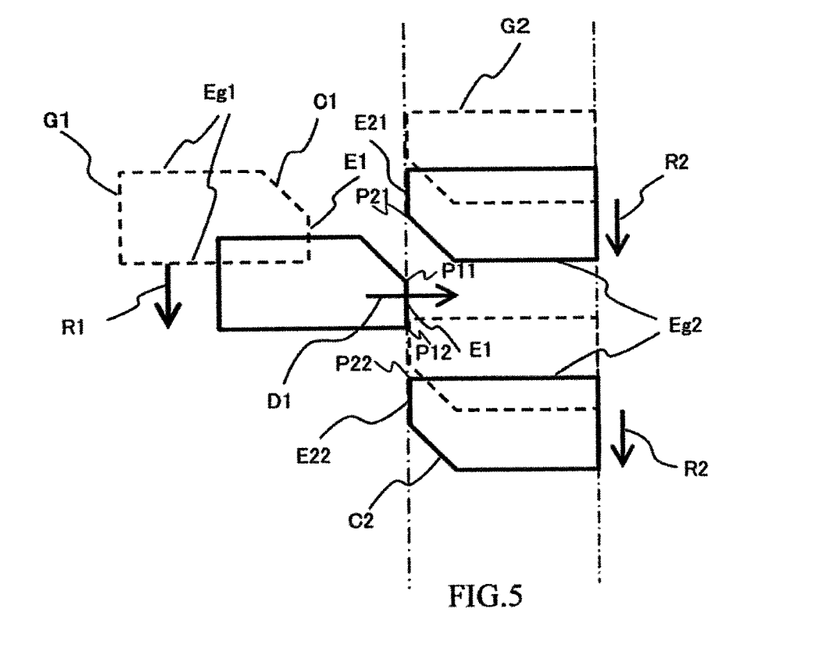
FIG. 5 is a diagram illustrating operations of the gear coupling device according to the first embodiment of the present invention during a process of engaging the gears to each other.

FIG. 5 is a diagram illustrating the operations of the gear coupling device according to the first embodiment of the present invention during the process of coupling the gears to each other. In FIG. 5, reference numerals that are the same as in FIG. 1 indicate the same parts as in FIG. 1.

FIG. 5 illustrates the operations to be performed during the process of coupling the gears to each other and schematically illustrates cross sections of parts of pitch circles of the gears. In addition, FIG. 5 illustrates past and present positions of a cross section of a tooth of the gear G1 and past and present positions of cross sections of first and second teeth of the gear G2. In FIG. 5, the past positions are indicated by broken lines, while the current positions are indicated by solid lines.

Since the gear G2 only rotates, the teeth of the gear G2 move in the direction indicated by the arrow R2 down side of the sheet of FIG. 5. Thus, the end surfaces of the teeth of the gear G2 are consistently on the same plane. The tooth of the gear G1 moves in the direction indicated by the arrow R1 down side of the sheet of FIG. 5 due to the rotation of the gear G1. In addition, the tooth of the gear G1 moves in the direction indicated by the arrow D1 toward the right side of the sheet of FIG. 5 due to the movement of the gear G1 in the axial direction of the gear G1.

At the current time (or in the state illustrated by the solid lines), the end surface of the tooth of the gear G1 matches the end surfaces of the teeth of the gear G2 due to the movement of the gear G1 in the axial direction. After that, the gear G1 further moves in the axial direction so that the gears are engaged with each other.

It is required for the gear G1 to engage with the gear G2 that the end surface of the tooth of the gear G1 and the end surfaces of the teeth of the gear G2 are located on the same plane (or in the state illustrated by the solid lines), and the tooth of the gear G1 are not in contact with the teeth of the gear G2. The requirement is estimated with the determination formula (1).

If the gears do not have the chamfers, it is necessary that engaging surfaces of the tooth of the gear G1 lie between engaging surfaces of the two teeth (adjacent to each other) of the gear G2 as a requirement for the engagement of the gears G1 and G2. In FIG. 5, at the current time (or in the state illustrated by the solid lines), the gears G1 and G2 are not located so that the engaging surfaces of the tooth of the gear G1 lie between the engaging surfaces of the two teeth (adjacent to each other) of the gear G2. However, since the gear G1 and the gear G2 have the chamfers, the chamfers prevent the end surfaces of the teeth of the gears G1 and G2 from contacting each other. In addition, as the gear G1 proceeds in the axial direction, the chamfer C1 of the gear G1 may collide with the chamfer C2 of the gear G2. However, since the chamfers C1 and C2 are inclined surfaces, a reaction force caused by the collision is dispersed in the rotational directions. A shock caused by the collision of the chamfers C1 and C2 is milder than a shock caused by collision of the end surfaces of the teeth of the gears G1 and G2. The chamfers C1 are located on the opposite side to the side to which the gear G1 rotates. Thus, when the circumferential speed of the gear G1 is higher than the circumferential speed of the gear G2, the phases of the gears G1 and G2 are shifted relative to each other before the gears G1 and G2 collide with each other, and a possibility that the gears G1 and G2 do not collide with each other grows. After the current time in the state illustrated in FIG. 5, the engaging surfaces of the gear G1 is highly likely to collide with the engaging surfaces of the gear G2 since the circumferential speed of the gear G1 is higher than the circumferential speed of the gear G2. Even when the engaging surfaces of the gear G1 collide with the engaging surfaces of the gear G2, a reaction force in the axial direction of the gear G1 is not generated. Thus, the collision of the engaging surfaces of the gear G1 with the engaging surfaces of the gear G2 does not prevent the engagement of the gears G1 and G2. Therefore, the seamless engagement can be achieved by determining, using the determination formula (1), whether or not it is time for the gear G1 to start moving.

As described above, if the gears G1 and G2 do not have the chamfers, it is necessary that the engaging surfaces Eg1 of the tooth of the gear G1 lie between the engaging surfaces Eg2 of the two teeth (adjacent to each other) of the gear G2 as the requirement for the engagement of the gears G1 and G2. On the other hand, the gears G1 and G2 are engaged with each other when the gears G1 and G2 have the chamfers and satisfy the following requirements (A) and (B): (A) a boundary P11 between the chamfer C1 of the gear G1 and the end surface of the tooth of the gear G1 is located on the side to which the gear G1 rotates in the direction indicated by the arrow R1 with respect to a boundary P21 between the chamfer C2 of the gear G2 and the end surface of the first tooth of the gear G2; and (B) an end portion P12 (included in the end surface of the tooth of the gear G1 and located on an end side of the end surface of the tooth of the gear G1 and the side to which the gear G1 rotates in the direction indicated by the arrow R1) is located on the opposite side to the side to which the gear G1 rotates in the direction indicated by the arrow R1 with respect to an end portion P22 (included in the end surface of the second tooth of the gear G2 and located on an end side of the end surface of the second tooth of the gear G2 and the opposite side to the side to which the gear G1 rotates in the direction indicated by the arrow R1). When the position of the boundary P11 between the chamfer C1 of the tooth of the gear G1 and the end surface of the tooth of the gear G1 matches the position of the boundary P21 between the chamfer C2 of the first tooth of the gear G2 and the end surface of the first tooth of the gear G2, the state in which the position of the boundary P11 matches the position of the boundary P21 indicates the threshold a of the determination formula (1). When the position of the end portion P12 (included in the end surface of the tooth of the gear G1 and located on the end side of the end surface of the tooth of the gear G1 and the side to which the gear G1 rotates in the direction indicated by the arrow R1) matches the position of the end portion P22 (included in the end surface of the second tooth of the gear G2 and located on the end side of the end surface of the second tooth of the gear G2 and the opposite side to the side to which the gear G1 rotates in the direction indicated by the arrow R1), the state in which the position of the end portion P12 matches the position of the end portion P22 indicates the threshold R of the determination formula (1). A requirement for the engagement in the determination formula (1) is that α<MOD (x, y), and this requirement is the aforementioned requirement (A). In addition, another requirement for the engagement in the determination formula (2) is that MOD (x, y)<β, and this requirement is the aforementioned requirement (B).

From another perspective, when the gears G1 and G2 have the chamfers, a requirement for the engagement of the gears G1 and G2 is that the end surface E1 of the tooth of the gear G1 lies between the end surface E21 of the first tooth of the gear G2 and the end surface E22 of the second tooth (adjacent to the first tooth) of the gear G2. This requirement can also be used as a requirement for engagement of gears that do not have chamfers.

As described above, in general, when the gears that are not coupled to each other is to be engaged by moving one of the gear in the axial direction, the gears collide and then cause friction in their end surfaces, and thereafter the gears are engaged with each other. While in the present embodiment, the gears can be engaged with each other without a collision and friction of the end surfaces of the teeth of the gears. Thus, a vibration and noise, occurring when the gears are coupled to each other, are reduced, and abrasions of the gears are reduced as well.

The configuration and operations of a gear coupling device according to a second embodiment of the present invention are described with reference to FIGS. 6, 7A and 7B.

Figure 6:
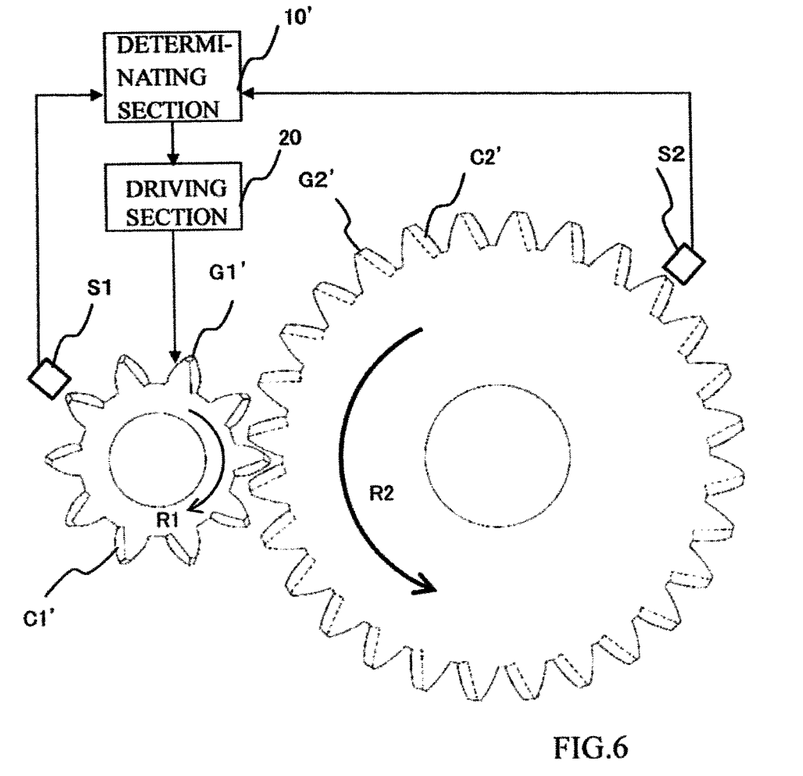
FIG. 6 is a diagram illustrating the entire configuration of a gear coupling device according to a second embodiment of the present invention.

FIG. 6 is a diagram illustrating the entire configuration of the gear coupling device according to the second embodiment of the present invention. FIGS. 7A and 7B are diagrams illustrating waveforms of signals output from the rotation sensors that are included in the gear coupling device according to the second embodiment of the present invention. In FIGS. 6, 7A and 7B, references that are the same as in FIGS. 1, 2A and 2B indicate the same parts as in FIGS. 1, 2A and 2B.

The second embodiment describes, as an example, a system that couples a gear G1' to a gear G2' while a circumferential speed of the gear G2' is higher than a circumferential speed of the gear G1'.

The second embodiment is different from the first embodiment described referred to FIGS. 1, 2A and 2B in terms of the circumferential speeds of the gears G1 and G2. The difference results in the difference in the positions of chamfers of teeth of the gears G1' and G2', and the different determination formula. Since the circumferential speed of the gear G1' is lower than the circumferential speed of the gear G2', chamfers C1' of the gear G1' are located on the side to which the gear G1' rotates in a direction indicated by an arc arrow R1 illustrated in FIG. 6. On the other hand, since the circumferential speed of the gear G2' is higher than the circumferential speed of the gear G1', chamfers C2' of the gear G2' are located on the opposite side to the side to which the gear G2' rotates in a direction indicated by an arc arrow R2 illustrated in FIG. 6.

Figure 7A:
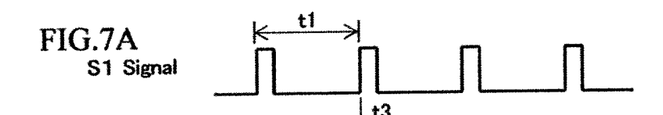
FIGS. 7A and 7B are diagrams illustrating waveforms of signals output from the rotation sensors that are included in the gear coupling device according to the second embodiment of the present invention.
Figure 7B:
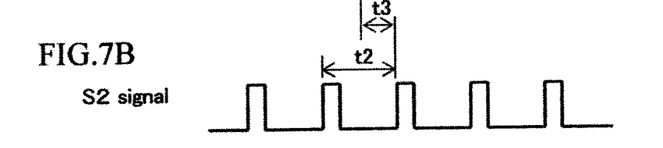

A determining section 10' receives chronological pulse signals illustrated in FIGS. 7A and 7B from the rotation sensors S1 and S2.

Next, a determination operation of the determining section 10' is described.

The determining section 10' uses the following determination formula (2) to determine whether or not it is time for the gear G1' to start moving.

[Formula 2]

$$\alpha' \le \text{MOD}\left(\frac{t_3}{t_1} + \frac{T}{t_2} - \frac{T}{t_1}, 1\right) \le \beta'. \qquad (2)$$

In the determination formula (2), a time difference $t_3$ between a rising time of a pulse of the signal output from the rotation sensor S1 (detecting a rotation of the gear G1') and a rising time of a pulse of the signal output from the rotation sensor S2 (detecting a rotation of the gear G2') is divided by a time interval $t_1$ between pulses obtained from the rotation sensor S1 so that the difference between a phase of the gear G1' and a phase of the gear G2' at the current time is calculated. This feature of the determination formula (2) is the difference from the determination formula (1). Regarding a calculation of the amount of change in the difference between the phases of the gears G1' and G2' over a time period T, the amount of change in the phase of the gear G1' over the time period T is subtracted from the amount of change in the phase of the gear G2' over the time period T. This feature of the determination formula (2) is the difference from the determination formula (1). Since the determination formula (2) is different from the determination formula (1), α' and β' are used as thresholds and set to values suitable for the system.

In the second embodiment, the gears G1' and G2' can be engaged with each other without a collision and friction of end surfaces of the teeth of the gears G1' and G2'. Thus, a vibration and noise occurring when the gears are coupled to each other are reduced, and abrasions of the gears are reduced as well.

Next, the configuration of operations of a gear coupling device according to a third embodiment of the present invention are described with reference to FIG. 8.

Figure 8:
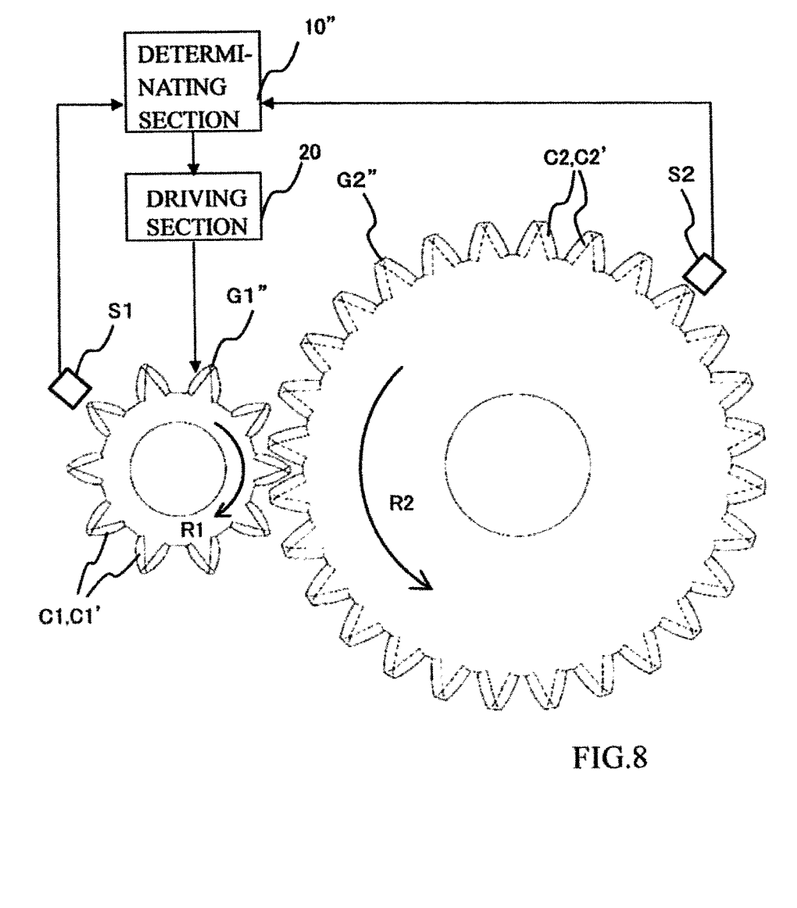
FIG. 8 is a diagram illustrating the entire configuration of a gear coupling device according to a third embodiment of the present invention.

FIG. 8 is a diagram illustrating the entire configuration of the gear coupling device according to the third embodiment of the present invention. In FIG. 8, reference numerals that are the same as in FIG. 1 indicate the same parts as in FIG. 1.

The third embodiment describes, as an example, a system that couples a gear G1" to a gear G2" regardless of whether a circumferential speed of the gear G1" is higher or lower than a circumferential speed of the gear G2".

The following features are different from the determination formula (1) described with reference to FIGS. 1, 2A and 2B. That is, in order to support the system that couples the gear G1" to the gear G2" regardless of whether the circumferential speed of the gear G1" is higher or lower than the circumferential speed of the gear G2", teeth of the gear G1" each have the chamfers C1 and C1', and teeth of the gear G2" each have the chamfers C2 and C2'. In addition to this, the determination formulas are used based on a situation. The chamfers C1 are located on the opposite side to the side to which the gear G1" rotates, while the chamfers C1' are located on the side to which the gear G1" rotates. The chamfers C2 are located on the opposite side to the side to which the gear G2" rotates, while the chamfers C2' are located on the side to which the gear G2" rotates.

A determining section 10" receives chronological pulse signals (illustrated in FIGS. 2A, 2B, 7A and 7B) from the rotation sensors S1 and S2.

Next, a determination operation of the determining section 10" is described.

The determining section 10" uses the following determination formulas (3) to determine whether or not it is time for the gear G1" to start moving.

[Formulas 3]

$$\begin{cases} \text{when } t_1 < t_2 & \alpha \leq \text{MOD}\left(\frac{t_3}{t_2} + \frac{T}{t_1} - \frac{T}{t_2}, 1\right) \leq \beta \\ \text{when } t_1 > t_2 & \alpha' \leq \text{MOD}\left(\frac{t_3}{t_1} + \frac{T}{t_2} - \frac{T}{t_1}, 1\right) \leq \beta' \end{cases} \quad (3)$$

When the circumferential speed of the gear G1" is higher than the circumferential speed of the gear G2", or when $t_1 < t_2$, the upper determination formula (3) is used. When the circumferential speed of the gear G1" is lower than the circumferential speed of the gear G2", or when $t_1 > t_2$, the lower determination formula (3) is used.

In the third embodiment, the gears G1" and G2" can be engaged with each other without a collision and friction of the end surfaces of the teeth of the gears. Thus, a vibration and noise occurring when the gears are coupled to each other are reduced, and abrasions of the gears are reduced as well.

Next, use of the first to third embodiments is described. When the relationship between the circumferential speeds of the gears is already determined, a configuration that is suitable for the relationship between the circumferential speeds of the gears is selected from the configurations described in the first to third embodiments. When a configuration can be arbitrarily selected, a configuration is selected from the first to third embodiments in the following manner.

When the gear G1 that has a smaller number of teeth is located on a driving side, or when the system is configured to reduce the rotational speed of the gear G2 through the gear G1, the configuration described with reference to FIGS. 1 to 5 in the first embodiment is suitable. This is because when power is to be transmitted from the gear G1 having the smaller number of the teeth, the power is transmitted to the gear G2 by causing a engaging surface (located on the opposite side to the side to which the gear G1 rotates) of a tooth of the gear G1 to contact an engaging surface of a tooth of the gear G2. At this time, a high contact load is applied to the engaging surface (located on the opposite side to the side to which the gear G1 rotates) of the tooth of the gear G1. In this case, a load applied to the engaging surface of the tooth of the gear G1 per unit of area when the tooth has the chamfer on the side of the interested engaging surface is equal to or lower than a load applied to the engaging surface of the tooth of the gear G1 per unit of area when the tooth does not have the chamfer. Therefore, the configuration described with reference to FIGS. 1 to 5 in the first embodiment is suitable.

As this example, there is a synchromesh mechanism that is used for an automatic manual transmission. In an automatic transmission formed by automating a transmission operation of a conventional passive transmission, a synchromesh mechanism is used in order to switch a gear to another gear and thereby change a path for transmitting power. The synchromesh mechanism includes rotary bodies that have teeth (nails). The rotary bodies are engaged with each other. The configuration described in the first embodiment can be applied to the synchromesh mechanism.

When the gear G2 that has a larger number of the teeth is located on the driving side, the configuration described with reference to FIGS. 6, 7A and 7B is suitable.

When the gear G1 that has the smaller number of the teeth is located on the driving side and a one-way clutch that transmits power only in a direction from the gear G1 to the gear G2 is provided, the configuration described with reference to FIGS. 6, 7A and 7B is suitable. The reason is as follows below. When the gears are coupled to each other with the circumferential speeds are different from each other, engaging surfaces of the gears collide with each other due to the coupling of the gears. When the circumferential speed of the gear G2 is higher than the circumferential speed of the gear G1 and the engaging surfaces of the gears collide with each other, rotational energy of the gear G2 is transferred to the gear G1. In this case, when the configuration includes the one-way clutch for transmitting power only in the direction from the gear G1 to the gear G2, transmission of exchanged rotational energy is blocked, and power is not transmitted further. In this case, since the mass of a target with which kinetic energy is exchanged does not need to be large, a generated reaction force is small. Thus, a shock that is caused by the coupling of the gears is small. Therefore, even when the gear G1 is located on the driving side, the configuration described with reference to FIGS. 6, 7A and 7B in the second embodiment is suitable for the system that has the one-way clutch.

As an example of this system, there is an engine starting device for a premesh type idling stop system. A starter is used to start an engine. A driving force of the starter for rotating the engine is transmitted from a pinion gear located on the starter side to a ring gear coupled to a crankshaft of the engine. Normally, at the time of engine start, the engine is in a stopped state and a rotational speed of the ring gear is 0. This state does not satisfy the requirements described in the embodiments. In recent years, however, an idling stop system that stops an engine when requirements for idling stop are satisfied, while restarts the engine when requirements for restarting the engine are satisfied, has been applied. In order to quickly restart the engine, the premesh type system has been considered. The premesh type system reduces the number of revolutions of the engine during the idling stop, and engages the pinion of the starter with the ring gear before the number of revolutions of the engine becomes 0. For the premesh type system, it is preferable that the number of revolutions of the engine be larger than the number of revolutions of the starter, or, that the rotational speed of the ring gear is higher than the rotational speed of the pinion. Thus, the requirements described in the second embodiment are satisfied. In the engine starting device for the premesh type idling stop system, the gear G1' illustrated in FIG. 6 corresponds to the pinion of the starter, and the gear G2' illustrated in FIG. 6 corresponds to the ring gear of the engine. Accordingly, the configuration described in the second embodiment can be selected.

For the same reason, the configuration described in the first embodiment is suitable for the system that has the one-way clutch and the gear G2 located on the driving side with the larger number of the teeth.

In addition, the configuration described in the third embodiment can be selected for a hybrid vehicle. In the hybrid vehicle, a driving force of an engine and a driving force of a motor are switched so that the force is transmitted to wheels of the hybrid vehicle. In general, a clutch mechanism is employed to switch the driving force sources. The configuration described in the third embodiment can be selected for a configuration in which a first gear is engaged with and disengaged from a second gear so as to transmit power or stop the transmission of the power instead of a clutch mechanism. Traditionally, gears are always engaged with each other.

However, it is not necessary that the gears be always engaged with each other, and a mechanical friction can be reduced, thereby, an energy efficiency of a hybrid system can be improved.

What is claimed is:

1. A gear coupling device comprising:
   two gears, that are engaged with each other for power transmission, and that are uncoupled from each other when at least one of the gears axially moves;
   a plurality of rotation sensors configured to detect rotations of the gears; and
   a determining section configured to determine, on the basis of signals detected by the rotation sensors, whether or not an end surface of a tooth of the axially moving gear lies between an end surface of a first tooth of the other gear and an end surface of a second tooth of the other gear, the first and second teeth being adjacent to each other;
   wherein the gears are coupled to each other from a disengaging state, in response to a result of a determination made by the determining section;
   wherein the determining section is configured to perform a calculation using:
     a time interval between a time when one of the rotation sensors detects that a tooth of one of the gears passes the one of the rotation sensors and a time when the other rotation sensor detects that a tooth of the other gear passes the other rotation sensor,
     a time interval between a time when the one of the rotation sensors detects that a tooth of the one of the gears passes the one of the rotation sensors and a time when the one of the rotation sensors detects that another tooth of the one of the gears passes the one of the rotation sensors,
     a time interval between a time when the other rotation sensor detects that a tooth of the other gear passes the other rotation sensor and a time when the other rotation sensor detects that another tooth of the other gear passes the other rotation sensor, and
     a time interval between a time when the determining section determines that it is time for the gear to start moving in the axial direction and a time when the position of an end surface of a tooth of one of the gears matches the position of an end surface of a tooth of the other gear; and
   wherein the determining section is configured to determine, on the basis of the result of the calculation, whether or not it is time for the gear to start moving in the axial direction.

2. The gear coupling device according to claim 1,
   wherein the determining section is configured to determine that it is time for the gear to start moving in the axial direction when $t_1 < t_2$, and when a remainder of a division of a value of $((t_3/t_2)+(T/t_1)-(T/t_2))$ by a value of one (1) is in a predetermined range,
   wherein $t_3$ is defined as the time interval between the time when the one of the rotation sensors detects that the tooth of the one of the gears passes the one of the rotation sensors and the time when the other rotation sensor detects that the tooth of the other gear passes the other rotation sensor,
   wherein $t_2$ is defined as the time interval between the time when the one of the rotation sensors detects that the tooth of the one of the gears passes the one of the rotation sensors and the time when the one of the rotation sensors detects that the other tooth of the one of the gears passes the one of the rotation sensors,
   wherein $t_1$ is defined as the time interval between the time when the other rotation sensor detects that the tooth of the other gear passes the other rotation sensor and the time when the other rotation gear detects that the other tooth of the other gear passes the other rotation sensor, and
   wherein T is defined as the time interval between the time when the determining section determines that it is time for the gear to start moving in the axial direction and the time when the position of the end surface of the tooth of the one of the gears matches the position of the end surface of the tooth of the other gear.

3. The gear coupling device according to claim 1,
   wherein the gears are coupled to each other, while a circumferential speed of one of the gears is higher than a circumferential speed of the other gear,
   wherein the gear that rotates at the higher circumferential speed has chamfers, that are edge surfaces of teeth of the gear, located on the side opposite to the side to which the gear rotates, and
   wherein the gear that rotates at the lower circumferential speed has chamfers, that are edge surfaces of teeth of the gear, located on the side to which the gear rotates.

4. A gear coupling method comprising the steps of:
   engaging two gears with each other for power transmission, and uncoupling the two gears from each other when at least one of the gears axially moves;
   wherein the gears are coupled to each other from the state in which the gears are uncoupled from each other, when a determination is performed, on the basis of signals obtained by detecting the rotations of the gears, that an end surface of a tooth of the axially moving gear lies between an end surface of a first tooth of the other gear and an end surface of a second tooth of the other gear, the first and second teeth being adjacent to each other;
   wherein the determination includes a calculation using:
     a time interval between a time when one of the rotation sensors detects that a tooth of one of the gears passes the one of the rotation sensors and a time when the other rotation sensor detects that a tooth of the other gear passes the other rotation sensor,
     a time interval between a time when the one of the rotation sensors detects that a tooth of the one of the gears passes the one of the rotation sensors and a time when the one of the rotation sensors detects that another tooth of the one of the gears passes the one of the rotation sensors,
     a time interval between a time when the other rotation sensor detects that a tooth of the other gear passes the other rotation sensor and a time when the other rotation sensor detects that another tooth of the other gear passes the other rotation sensor, and
     a time interval between a time when the determining section determines that it is time for the gear to start moving in the axial direction and a time when the position of an end surface of a tooth of one of the gears matches the position of an end surface of a tooth of the other gear; and
   wherein the determination is made, on the basis of the result of the calculation, whether or not it is time for the gear to start moving in the axial direction.

5. The gear coupling method according to claim 4,
   wherein the determination that it is time for the gear to start moving in the axial direction is made when $t_1 < t_2$, and when a remainder of a division of a value of $((t_3/t_2)+(T/t_1)-(T/t_2))$ by a value of one (1) is in a predetermined range, wherein $t_3$ is defined as the time interval between the time when the one of the rotation sensors detects that the tooth of the one of the gears passes the one of the rotation sensors and the time when the other rotation sensor detects that the tooth of the other gear passes the other rotation sensor, wherein $t_2$ is defined as the time interval between the time when the one of the rotation sensors detects that the tooth of the one of the gears passes the one of the rotation sensors and the time when the one of the rotation sensors detects that the other tooth of the one of the gears passes the one of the rotation sensors, wherein $t_1$ is defined as the time interval between the time when the other rotation sensor detects that the tooth of the other gear passes the other rotation sensor and the time when the other rotation gear detects that the other tooth of the other gear passes the other rotation sensor, and wherein T is defined as the time interval between the time when the determining section determines that it is time for the gear to start moving in the axial direction and the time when the position of the end surface of the tooth of the one of the gears matches the position of the end surface of the tooth of the other gear.

6. The gear coupling method according to claim 4, wherein the gears are coupled to each other when a circumferential speed of one of the gears is higher than a circumferential speed of the other gear, wherein the gear that rotates at the higher circumferential speed has chamfers, that are edge surfaces of teeth of the gear, located on the side opposite to the side to which the gear rotates, and wherein the gear that rotates at the lower circumferential speed has chamfers, that are edge surfaces of teeth of the gear, located on the side to which the gear rotates.

* * * * *